(12) United States Patent
Elend

(10) Patent No.: US 7,504,853 B2
(45) Date of Patent: Mar. 17, 2009

(54) ARRANGEMENT FOR COMPENSATION OF GROUND OFFSET IN A DATA BUS SYSTEM

(75) Inventor: Bernd Elend, Hamburg (DE)

(73) Assignee: NXP B.V., Eindhoven (NL)

(*) Notice: Subject to any disclaimer, the term of this patent is extended or adjusted under 35 U.S.C. 154(b) by 526 days.

(21) Appl. No.: 10/545,050

(22) PCT Filed: Feb. 9, 2004

(86) PCT No.: PCT/IB2004/000314

§ 371 (c)(1),
(2), (4) Date: Aug. 10, 2005

(87) PCT Pub. No.: WO2004/072854

PCT Pub. Date: Aug. 26, 2004

(65) Prior Publication Data

US 2006/0146942 A1 Jul. 6, 2006

(30) Foreign Application Priority Data

Feb. 13, 2003 (EP) ................... 03100317

(51) Int. Cl.
*H03K 19/003* (2006.01)
(52) U.S. Cl. .......................... 326/33; 326/26
(58) Field of Classification Search .............. 326/21, 326/26, 30, 31–34
See application file for complete search history.

(56) References Cited

U.S. PATENT DOCUMENTS

| 5,384,808 A |   | 1/1995 | Oprescu et al. |
| 5,513,218 A |   | 4/1996 | Moller |
| 5,748,675 A | * | 5/1998 | Hormel et al. ............ 375/257 |
| 5,892,893 A | * | 4/1999 | Hanf et al. ................ 714/3 |

FOREIGN PATENT DOCUMENTS

| DE | 36 14 208 | 10/1987 |
| GB | 2 284 954 | 2/1992 |

* cited by examiner

*Primary Examiner*—James H Cho
(74) *Attorney, Agent, or Firm*—Peter Zawilski

(57) ABSTRACT

A description is given of an arrangement for compensation of ground offset in a data bus system comprising a plurality of communication devices (2, 10) which are each supplied with an operating voltage (U0) by a voltage source (4; 14), are connected to ground (G1); G2) and have a data bus connection (6; 12) via which they are connected to a data bus line (8). The special thing about the invention is that between operating voltage (U0) and ground (G2) at least one voltage dividing device (R3, R6) is connected whose output is coupled to the data bus connection (12) of at least one communication device (10) and whose voltage dividing ratio is selected such that an offset of the ground (G2) of the communication device (10), whose data bus connection (12) is coupled to the voltage dividing device (R3, R6), is in essence compensated compared to ground (G1) of another communication device (2).

10 Claims, 5 Drawing Sheets

ARRANGEMENT FOR COMPENSATION OF GROUND OFFSET IN A DATA BUS SYSTEM

The invention relates to an arrangement for compensation of ground offset in a data bus system comprising a plurality of communication devices which are each supplied with an operating voltage by a voltage source, are connected to ground and have a data bus connection by which they are connected to a data bus.

Ground offset is understood to mean a potential difference between different ground points where the ground points may be assigned to the same consumer of electricity or also to various consumers of electricity. There is a ground offset if the electrical connection between the ground points has ohmic resistance. This is usually the case with ground points that are relatively far apart, where there is a noticeable ohmic resistance because of the large distance. But also with relatively small distances there may, under unfavorable conditions, be a ground offset. Unfavorable conditions are usually found in vehicles where the ground points are present on the car body. A car body, which is made of metal, is electrically conductive, it is true, but experience has taught that there are transitional resistors at many places which resistors then cause a ground offset to occur.

A ground offset leads to a shift of potential which may considerably affect the functioning of the electrical system. Especially sensitive are data bus systems when the voltage levels of the transmitted signals are changed so much by the ground offset that they are no longer recognized. Particularly in single-wire data bus systems a ground offset leads to the breakdown of the communication relatively fast, because the receiver no longer sees the voltage level necessary for reception on the data bus line, for the case where the ground offset exceeds a certain magnitude.

In DE 36 14 208 C2 is disclosed an arrangement for connecting a power output circuit to a bus coupling device in which an intermediate circuit having a Schmitt trigger behavior and a blocking input is inserted into the data lines between the bus coupling device and the power output circuit and furthermore a high-ohmic barrier resistance is included in that data line which runs from the bus coupling device to the intermediate circuit. As a result of the high-ohmic barrier resistance a quasi-separation of potential is achieved between the logic to the bus coupling and the output circuit comprising the power amplifiers. This provides a large EMC stability of the whole circuit.

WO 95/34152 discloses a communication network transceiver which is used in vehicles. The transmitter of the transceiver comprises an electronic ground offset circuit which is connected to an independent DC ground return line and accordingly adjusts the voltage potential of the signals to be transmitted in relation to the ground potential on this ground return line. Along with the data line this independent DC voltage ground return line leads to the receiver where there is a complementary ground offset circuit in order to accordingly transform the voltage potential of the received signals back then with regard to the ground ratio actually present there. This arrangement is suitable for two-wire bus systems, but not for single-wire bus systems.

GB 2 284 954 A shows a data bus driver generating a bias voltage, which driver in a central node of a communication network switches a bias level signal to each peripheral node via a data bus line in order to accordingly cancel out different ground potentials.

U.S. Pat. No. 5,513,218 A describes a ground offset compensation circuit which comprises a what is called integrator which is used to simulate the ground voltage of the line and apply this voltage to the ground of the transmitter. The integrator comprises a small current source and a very large current sink to be able to follow the ground potential of the line.

It is an object of the present invention to propose an arrangement for compensation of ground offset which has a simple structure and is particularly suitable also for single-wire data bus systems.

This object is achieved in that in the arrangement of the type mentioned in the opening paragraph at least one voltage dividing device whose output is coupled to the data bus connection of at least one communication device and whose voltage dividing ratio is selected such that an offset of the ground of the communication device whose data bus connection is coupled to the voltage dividing device, is compensated in essence relative to the ground of another communication device.

The invention utilizes the recognition that because of a ground offset there flows an equalizing current over the data bus line between the communication devices. This equalizing current is reduced by the arrangement according to the invention of a voltage dividing device and a respectively selected voltage dividing ratio at least so much that the ground offset is compensated in essence.

The invention is particularly advantageously suitable for single-wire bus systems, but is also recommended for two-wire bus systems with split termination.

It is expedient that the voltage dividing ratio can be adjusted.

If the voltage dividing device comprises at least a first resistor connected between the operating voltage and the data bus connection and at least a second resistor between the data bus connection and ground, the resistance value of the first and/or second resistor should be changeable.

Alternatively, further resistors can be connected in series with the first and/or second resistor, which further resistors can optionally be bridged by further switching means.

In a further alternative embodiment further resistors which can optionally be connected or disconnected can be connected in parallel with the first and/or second resistor.

It is also conceivable for a current source to be connected in parallel to the first and/or second resistor.

It is expedient for an adjusting device to be provided for adjusting the voltage dividing ratio. This adjusting device can accordingly control the resistance value of the first and/or second resistor or the switching means for bridging parallel resistors or turning series connected resistors on and off. The adjusting device may also accordingly control the current source mentioned above.

Preferably, the voltage dividing ratio of the voltage dividing device can be set such that the no-load voltage on the bus connection of the associated communication device corresponds to about half the operating voltage.

Particularly in order to limit the current, a terminating resistor may be inserted between the data bus connection and the data bus line.

These and other aspects of the invention are apparent from and will be elucidated with reference to the embodiments described hereinafter.

Figure 1:
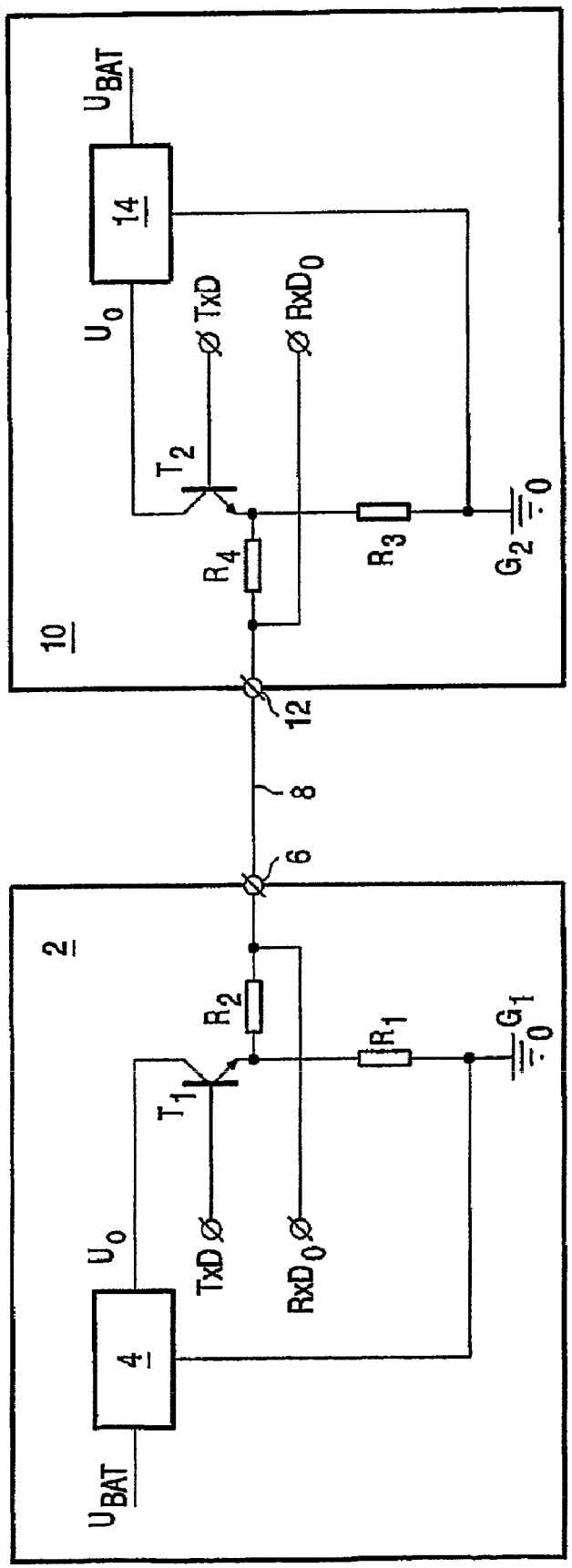
FIG. 1 shows a circuit diagram of a single-wire bus system comprising two communication terminals.
Figure 3:
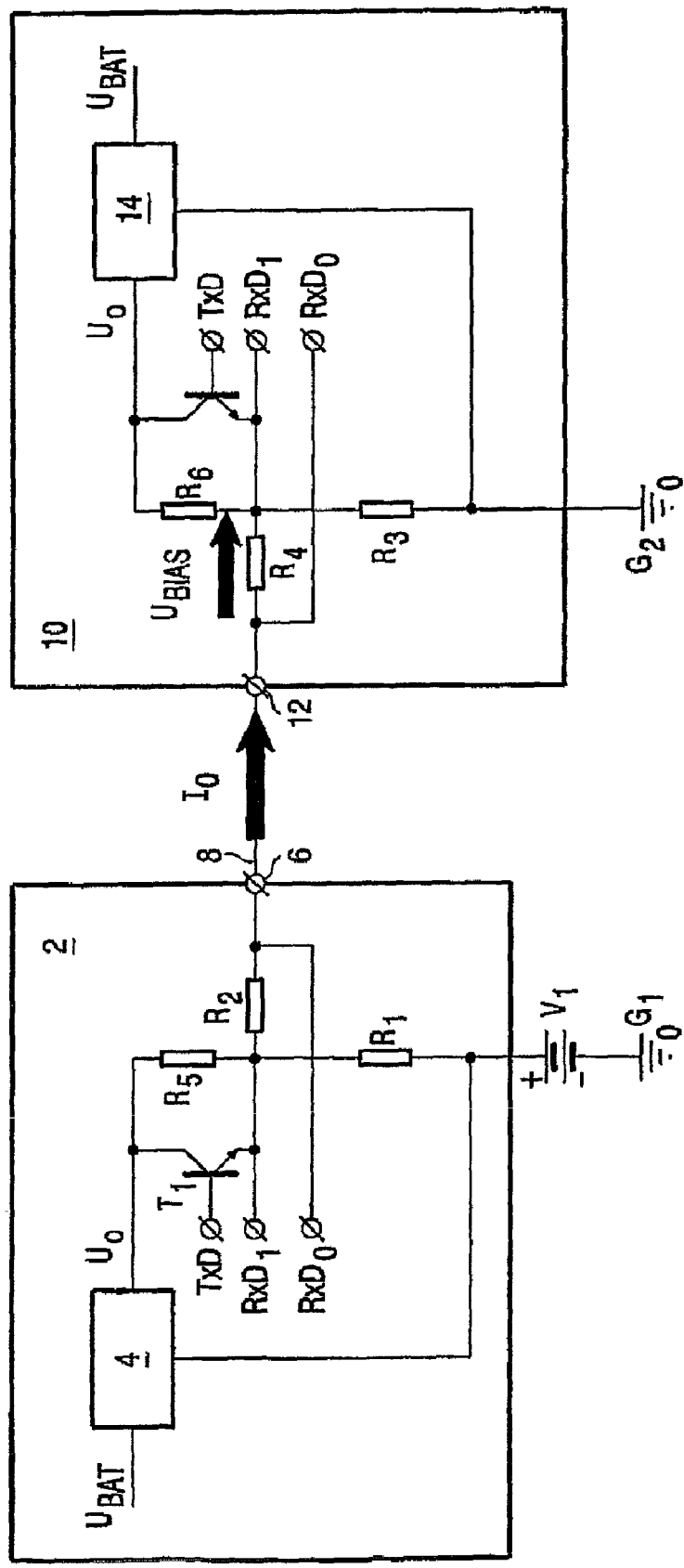
Figure 4:
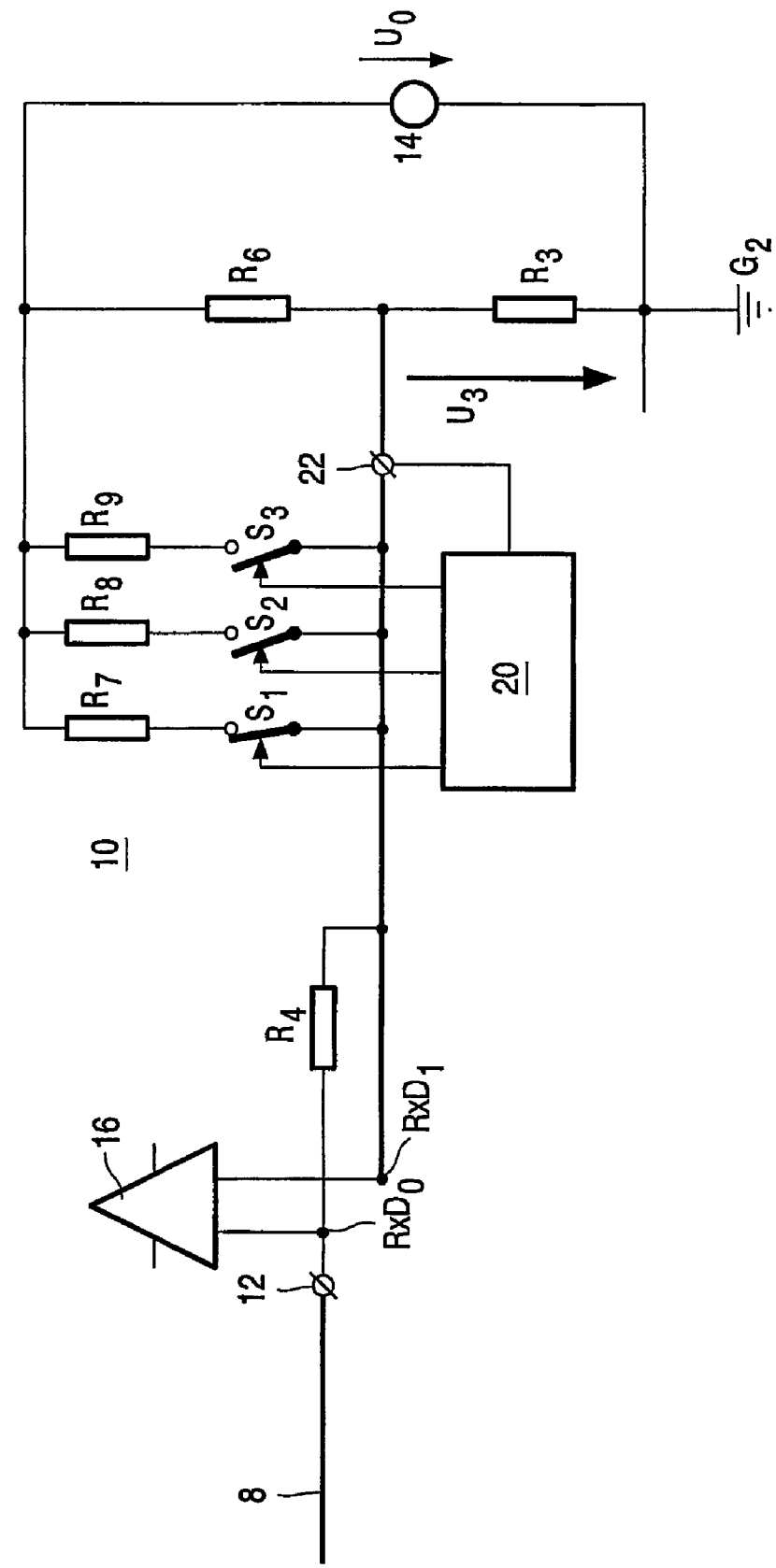
Figure 5:
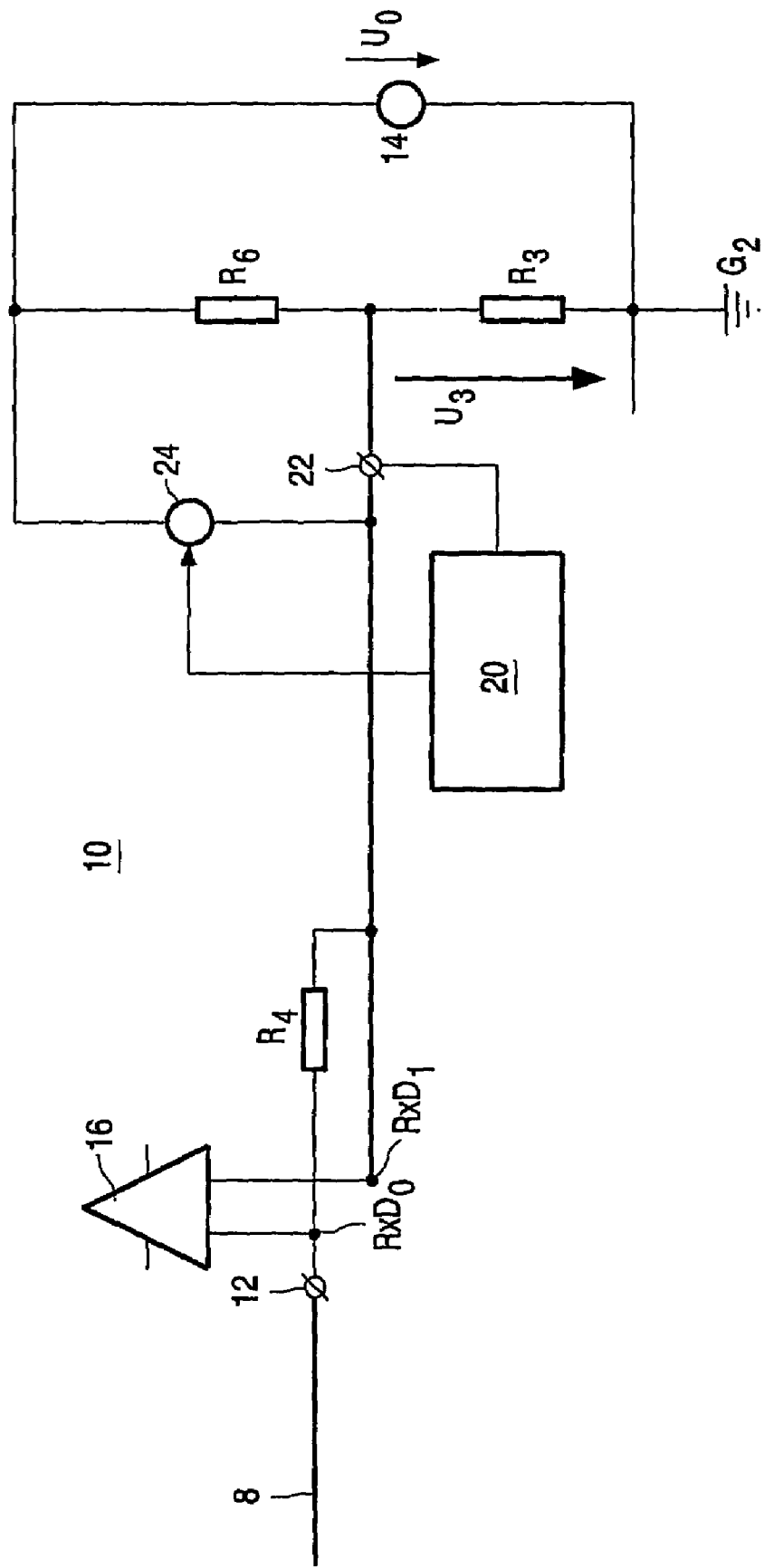

FIG. 3 shows the same bus system as FIG. 1 in which the communication terminals additionally have a simple voltage divider to increase the no-load voltage on their data bus connection; and FIG. 4 shows a circuit diagram of part of a communication terminal with an extended voltage divider whose voltage dividing ratio can be adjusted in accordance with a first preferred embodiment of the invention and FIG. 5 shows a circuit diagram of part of a communication terminal having a controllable current source for justifying the voltage dividing ratio in accordance with the second preferred embodiment of the invention.

FIG. 1 shows a typical single-wire bus system which comprises, for example, two communication terminals. Single-wire bus systems are pre-eminently suitable in that the data bus line connecting the communication terminals has only one conductor and thus comprises only a single "wire" and the individual communication terminals are furthermore connected to ground. Such a bus concept is used, for example, in vehicles where the ground is formed by the body work which is made of metal.

The first communication terminal 2 shown in FIG. 1 comprises a power supply or a voltage transformer 4 which is supplied with an external voltage $U_{BAT}$ and generates internal operating voltage $U_0$ necessary for the modules of the communication node 2. Particularly in vehicles the external voltage $U_{BAT}$ is customarily rendered available by a battery. The power supply or voltage transformer 4 respectively is furthermore connected to ground $G_1$. Further is schematically shown a send transistor $T_1$ to whose collector is applied the operating voltage $U_0$ and whose base is connected to the connection TxD at which a transmit signal is present. The emitter of the send transistor $T_1$ is switched to ground $G_1$ via a first resistor $R_1$. Furthermore, the emitter of the send transistor $T_1$ is connected to a data bus connection 6 via a terminating resistor $R_2$, to which terminal the transmit signal amplified by the send transistor $T_1$ is applied. The send transistor $T_1$ forms part of a transmitting stage not further shown here, in which the transmit signal mentioned earlier is generated. Furthermore is coupled to the data bus connection 6 a connection $RxD_0$ from which a receive signal is tapped which is applied to a receiving stage not shown in FIG. 1.

The first communication terminal 2 is connected to a data bus line 8 by a data bus connection 6, which data bus line 8 comprises a single conductor or single "wire" respectively.

To this data bus line 8 is connected a second communication terminal 10 via a corresponding data bus connection 12. The second communication terminal 10 has a similar structure in the representation of FIG. 1 to the first communication terminal 2. The second communication terminal 10 also comprises a power supply or voltage converter 14 respectively which is usually supplied with the same external voltage $U_{BAT}$ as the first communication terminal 2. The power supply or voltage transformer 14 respectively is switched to ground $G_2$ and generates an internal operating voltage $U_0$ which is applied to the collector of a send transistor $T_2$ whose base is coupled to a connection TxD to which a transmit signal is applied. The emitter of the send transistor $T_2$ is switched to ground $G_2$ via a third resistor $R_3$. Furthermore, a terminating resistor $R_4$ connects the emitter of the send transistor $T_2$ to a data bus connection 12. Also with the second communication terminal 10 the send transistor $T_2$ in the representation of FIG. 1 forms part of a transmitting stage (not further shown) in which the transmit signal is generated. Not only the transmit signal amplified by the send transistor $T_2$ is transmitted via the data bus connection 12, but also a receiving signal is obtained which is fed to a receiving stage (not shown either) via a connection $RxD_0$.

Figure 2:
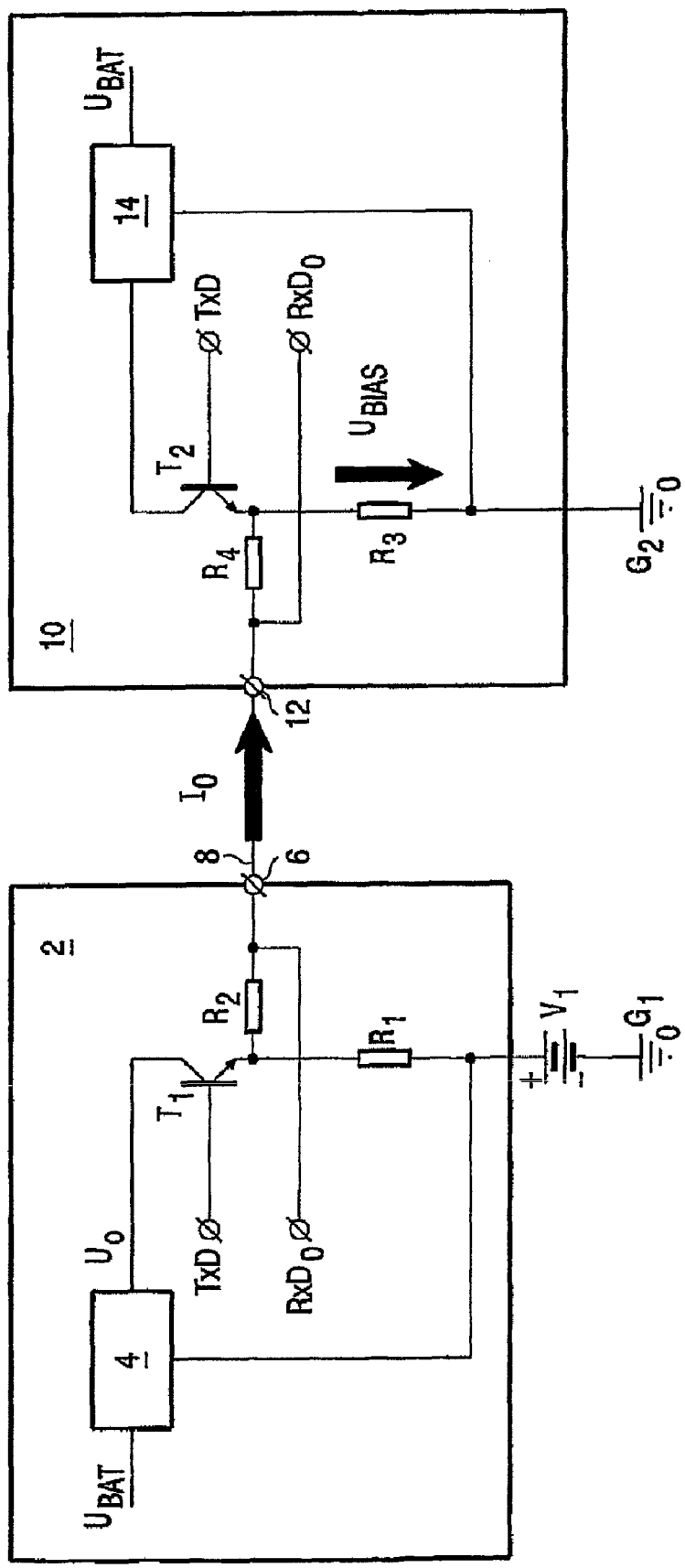
FIG. 2 shows the same circuit diagram as FIG. 1 with additionally a substitute voltage source representing a ground offset.

If there is ground offset between the two communication terminals 2, 10, thus a potential difference between ground $G_1$ and ground $G_2$, this offset can be represented by a substitute voltage source $V_1$ as is schematically shown in FIG. 2. In a situation shown in FIG. 2 a voltage arises between the first communication terminal 2 and ground $G_1$ as a result of the ground offset. The result is an equalizing current $I_0$ flowing from the first communication terminal 2 over the data bus line 8 to the second communication terminal 10, and a bias voltage being generated over the resistors $R_3$ and $R_4$, which voltage corrupts the input signal on connection $RxD_0$. In this manner a voltage can be applied to the input of the receiving stage (not shown) which exceeds the receiving threshold for the recognition of a valid data signal, so that the communication between the two communication terminals 2, 10 is disturbed or even completely prevented.

FIG. 3 shows an arrangement in which the no-load voltage has been increased to half the operating voltage $U_0/2$ by a simple voltage divider. This is achieved by connecting a fifth resistor $R_5$ in the first communication terminal 2 between the power supply or voltage transformer 4 respectively and the terminating resistor $R_2$ and in the second communication terminal 10 a sixth resistor $R_6$ between the power supply or voltage transformer 14 respectively and the terminating resistor $R_4$. Therefore, in the first communication terminal 2 the resistors $R_1$ and $R_5$ and in the second communication terminal 10 the resistors $R_3$ and $R_6$ form a simple voltage divider. The voltage to be tapped from the receiving stage (not shown) is now no longer found between $RxD_0$ and ground as in the arrangement shown in FIG. 1, but between $RxD_0$ and another connection $RxD_1$ which is coupled to the nodes between the resistors $R_1$ and $R_5$ or $R_3$ and $R_6$ on the one hand and to the receiving stage (not shown in FIG. 3) on the other hand, and thus to the terminating resistor $R_2$ or $R_4$ respectively. The problem of ground offset continues to be felt, it is true, but now the additional voltage $U_{BIAS}$ to be considered in a second communication terminal 10 drops via the terminating resistor $R_4$.

FIG. 4 diagrammatically shows a simple concept for compensation of ground offset.

For this purpose, the communication terminal 10 whose ground $G_2$ in the arrangement shown lies at a lower potential compared to the ground $G_1$ of the first communication terminal 2 and is thus offset "downward", comprises additional seventh, eighth and ninth resistors $R_7$, $R_8$ and $R_9$ which are connected in parallel with the sixth resistor $R_6$ and can be switched on by associated first, second and third switches $S_1$, $S_2$ and $S_3$. In this way a voltage divider that can be trimmed is formed in the second communication terminal, which voltage divider can be adjusted by selectively switching the additional resistors $R_7$, $R_8$ and $R_9$ on and off, so that the equalizing current $I_0$ and thus also $U_{BIAS}$ caused by the ground offset can be reduced or even completely eliminated. Switching the additional resistors $R_7$ to $R_9$ on is effected in dependence on the voltage $U_3$ applied to the "downward" third resistor $R_3$. Usually, a minimum threshold is determined for this voltage $U_3$. The additional resistors $R_7$ to $R_9$ are then to be connected such that the voltage $U_3$ lies at least slightly above this threshold value. In this way a ground $G_2$ for the second communication terminal is raised to the same potential as the "upwardly" offset ground $G_1$ of the first communication terminal 2 and thus matched accordingly. At this point it should be observed for completeness' sake that instead of a three-stage implementation of additional resistors also a smaller or larger number of additional resistors or even only a single additional resistor can be provided as desired.

FIG. 4 further schematically shows the receiving stage as an operational amplifier and featured by the reference numeral 16, whose one input is coupled to $R \times D_0$ and whose other input is coupled to $R \times D_1$.

In the example of embodiment shown the voltage dividing ratio in the second communication terminal 10 is trimmed by selectively opening and closing the switch $S_1$ to $S_3$. For this purpose, a control device 20 is provided which measures for example via a measuring point 22 the voltage $U_3$ on the third resistor $R_3$ and, in dependence on a previously set threshold, accordingly opens and closes the switches $S_1$ to $S_3$. This may be advantageous particularly in case of fluctuating ground offset.

Other measures are conceivable too to set the voltage dividing ratio, and thus compensate the ground offset. For example, instead of the additional resistors $R_7$ to $R_9$, a current source 24 may be inserted which is accordingly controlled by the control device 20 as shown in FIG. 5.

Furthermore, it should be observed at this point that the possibility of adjusting the voltage dividing ratio as is shown, for example, in FIGS. 4 and 5, need not take place only in the second communication terminal 10, but preferably also additionally in the first communication terminal 2 in corresponding manner. For, as a rule, it is not known a priori which of the communication terminals in operation has an "offset" ground which, for that matter, can also change during operation.

Finally it should be pointed out that the concept described hereinbefore can also be used for compensation of ground offset for example for two-wire bus systems with what is called split termination.

The invention claimed is:

1. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, in which the voltage dividing device comprises at least a first resistor connected between the operating voltage and the data bus connection and at least a second resistor connected between the data bus connection and ground, characterized in that the resistance value of at least one of the first and second resistor can be changed.

2. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, and wherein the voltage dividing ratio can be adjusted; and the voltage dividing device comprises at least a first resistor connected between the operating voltage and the data bus connection and at least a second resistor connected between the data bus connection and ground, characterized in that further resistors are connected in series with at least one of the first and second resistor which further resistors can be bridged as required by switching circuits.

3. An arrangement as claimed in claim 2, characterized by an adjusting device that controls the switching circuitry.

4. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to of at least one communication device and whose voltage dividing ratio is selected such that an offset of the ground of the communication device whose data bus connection is coupled to the voltage dividing device is compensated in essence relative to the ground of another communication device, and wherein the voltage dividing ratio can be adjusted; and the voltage dividing device comprises at least a first resistor connected between the operating voltage and the data bus connection and at least a second resistor connected between the data bus connection and ground, characterized in that further resistors are connected in parallel with at least one of the first and second resistor which further resistors can be switched on or off as required by the switching means.

5. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, in which the voltage dividing device comprises at least a second resistor connected between the data bus connection and ground, characterized in that a current source is connected in parallel with at least one of the first and second resistor and the voltage dividing ratio can be adjusted.

6. An arrangement as claimed in claim 5, characterized by an adjusting device that controls the current source.

7. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, further including an adjusting device that controls the resistance value of at least one of the first and second resistor.

8. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, characterized in that the voltage dividing ratio of the voltage dividing device is set so that the no-load voltage on the data bus connection corresponds to about half the operating voltages.

9. An arrangement for compensation of ground offset in a data bus system comprising a plurality of communication devices which are each supplied with an operating voltage by a voltage source are connected to ground and have a data bus connection via which they are connected to a data bus line, characterized by at least one voltage dividing device whose output is coupled to the data bus connection of at least one communication device and whose voltage dividing ratio is selected such that an offset of the ground of the communication device whose data bus connection is coupled to the voltage dividing device is compensated in essence relative to the ground of another communication device, characterized in that a terminating resistor is connected between the data bus connection and the data bus line.

10. A data bus system comprising a plurality of communication devices which are each supplied with operating voltage by a voltage source, are connected to ground and have a data bus connection via which they are connected to a data bus line, characterized by an arrangement as claimed in any of the preceding claims.

* * * * *